United States Patent
Balasubramanian

[11] Patent Number: 5,870,530
[45] Date of Patent: Feb. 9, 1999

[54] SYSTEM FOR PRINTING COLOR IMAGES WITH EXTRA COLORANTS IN ADDITION TO PRIMARY COLORANTS

[75] Inventor: Raja Balasubramanian, Webster, N.Y.

[73] Assignee: Xerox Corporation, Stamford, Conn.

[21] Appl. No.: 721,672

[22] Filed: Sep. 27, 1996

[51] Int. Cl.⁶ .................................................. B41B 15/00
[52] U.S. Cl. ......................... 395/109; 395/101; 358/518; 382/167
[58] Field of Search ........................... 395/109, 101–102, 395/104, 106–108; 358/500–501, 515, 518–522, 525; 382/162, 167

[56] References Cited

U.S. PATENT DOCUMENTS

| | | | |
|---|---|---|---|
| 4,275,413 | 6/1981 | Sakamoto et al. | 358/80 |
| 4,500,919 | 2/1985 | Schreiber | 358/518 |
| 4,812,899 | 3/1989 | Kueppers | 358/75 |
| 4,893,179 | 1/1990 | Ito | 358/79 |
| 5,047,844 | 9/1991 | Ikeda et al. | 358/521 |
| 5,077,604 | 12/1991 | Kivolowitz et al. | 358/75 |
| 5,087,126 | 2/1992 | Pochieh | 356/402 |
| 5,136,372 | 8/1992 | Nakatani et al. | 358/80 |
| 5,140,411 | 8/1992 | Haneda et al. | 358/75 |
| 5,208,663 | 5/1993 | Hiratsuka et al. | 358/75 |
| 5,528,386 | 6/1996 | Rolleston et al. | 358/522 |
| 5,633,953 | 5/1997 | Kouzaki | 382/167 |

OTHER PUBLICATIONS

Ostromoukhov, "Chromaticity Gamut Enhancement by Heptatone Multi–Color Printing," *SPIE*, vol. 1909, p. 139, Jun. 1993.

Boll, "A Color to Colorant Transformation for a Seven Ink Process," presented at the IS&T–SPIE Symposium on Electronic Imaging, Science and Technology, Feb. 1994.

"New Era of Digital Photo Printing . . . ", *Hard Copy Observer*, Oct. 1996, p. 1, and its ancillary articles.

*Primary Examiner*—Arthur G. Evans
*Assistant Examiner*—Sterling W. Chandler
*Attorney, Agent, or Firm*—R. Hutter

[57] ABSTRACT

In a "hi-fi" color printing system, wherein colorants of secondary colors beyond the regular CMYK primary colorants are available, the colorants of the secondary colors are substituted for combinations of the primary colorants in order to obtain a full color gamut. The functions by which colorants of the secondary colors are substituted for primary colorant are non-linear through a path in the color space.

7 Claims, 4 Drawing Sheets

SYSTEM FOR PRINTING COLOR IMAGES WITH EXTRA COLORANTS IN ADDITION TO PRIMARY COLORANTS

The present invention relates to digital printing systems, in which images based on electronic image signals are printed. More specifically, the present invention relates to what are sometimes known as "hi-fi" electronic color printing systems, in which a range of possible colors are formed by more than the typical three primary colors.

FIG. 1 represents a representative "slice" of color space in the visible spectrum, showing the additive and subtractive primary colors. (As is known in the art of color science, the slice illustrated in FIG. 1 is a section of a three-dimensional color space, with a white-to-black neutral axis emerging from the center of the diagram out of the page. However, this dimension of color space is not directly relevant to the present discussion.) Around the perimeter of the section of color space are shown locations representing a full saturation of the subtractive primary colors yellow (Y), magenta (M), and cyan (C). These subtractive colors, as is well known, are used in the printing of images, because combinations of these colors can theoretically simulate all other colors in the visible spectrum.

Located between the various pairs of subtractive primary colors in the color space are what are here called the "secondary colors," blue (B), red (R), and green (G). As can be seen in the Figure, each secondary color can theoretically be simulated by combining, such as on a printed surface, colorants (such as toner or ink) of the two adjacent primary colors, so that magenta plus cyan together on a printed sheet would yield blue, while cyan and yellow would produce green, and so forth. However, particularly in the field of xerography, where images are typically formed with dry powders which are fused onto a paper sheet, this theoretical mixing of primary colors to yield other colors may result in a limited printer gamut. The inevitable chemical shortcomings of typical toner compositions will often cause combinations of primary color toner to yield a sub-optimal rendering of the desired combination color.

Within the hexagon shown in the Figure, wherein colors of any kind will be more vivid (i.e., have higher chroma) as one approaches the perimeter, the shaded area bounded by solid curved lines represents a typical practical gamut of colors obtainable with the printing apparatus. If it is attempted to print one of the primary colors, such as yellow, yellow toner is simply applied to the sheet, unalloyed with any other color; in such a case, pure yellow toner will yield the theoretical maximum chrominance of the desired color. This optimal use of uncombined primary color is represented by the fact that the solid curved line within the hexagon meets the perimeter of the hexagon only at the point of pure color, when yellow toner is not combined with any magenta or cyan toner.

However, if is desired, for example, to print a green area, there must be supplied onto the paper a visually-effective combination (either dots next to dots, or one toner layer on another) of yellow with cyan. As long as one primary color dominates, almost optimal chrominance can be achieved, as is shown by the fact that the curved solid line is reasonably close to the hexagon when yellow or cyan dominates. When colors toward a pure green are desired, which would require close to a half-and-half split of the two types of toner, the lack of chrominance becomes noticeable, as shown in the Figure by the fact that, near the area marked G, the solid curved line is quite far from the corner of the hexagon which represents a perfect green. In practical terms, the fact that the solid curved line is far from the perimeter of the hexagon results in a distinct dull or grayish appearance when the combination color is attempted. A similar lack of chrominance will appear when other secondary hues, such as red or blue, are attempted to be printed with close-to-equal proportions of a subtractive colors.

It has been proposed, particularly in the art of xerographic printing, to overcome the problem of obtaining the secondary hues by providing printing apparatus which lays down not only the CMY primary colors, but also one or more apparatus (such as development units) which lay down one or more types of toner to print secondary hues, such as RGB. Instead of trying to obtain, for example, pure blue by mixing magenta and cyan toners, such a system would simply lay down a dedicated blue toner. With the addition of a black (K) development unit such as for printing of text, such "hi-fi" color printing systems would typically include as many as seven development units.

One object of the present invention is to provide a system whereby a "hi-fi" colorant is optimally substituted for a combination of subtractive primary colors.

In the prior art, U.S. Pat. No. 4,275,413 discloses a linear interpolation method for locating outputs of a three-dimensional look-up table, such as to convert a desired color from RGB to CMY color space.

U.S. Pat. No. 4,500,919 discloses a basic technique for obtaining a specific desired color from signals representative of various primary colors.

U.S. Pat. No. 4,812,899 discloses a printing technique in which the picture surface is divided into subsurfaces of identical size, with every subsurface divided into juxtaposed elemental surfaces which form a chromatic component and a achromatic component. The elemental surfaces which form the chromatic component are printed with a maximum of two of six chromatic printing inks, such as yellow, orange-red, magenta-red, violet-blue, cyan-blue, green and black.

U.S. Pat. No. 4,893,179 discloses a digital copier including a decomposing circuit for decomposing a color image into three fundamental colors. The original RGB data derived from the original decomposition is then converted to CMYK data for xerographically printing the image.

U.S. Pat. No. 5,047,844 discloses a color printing apparatus in which an edge portion of an achromatic area is detected to emphasize the edge portion and reduce the density of a chromatic area near the edge portion. This technique results in a reduction of color bleeding.

U.S. Pat. No. 5,077,604 discloses a method for converting RGB color separation signals into an equivalent CMYK image signals.

U.S. Pat. No. 5,087,126 discloses a method of estimating a combination of fundamental colors which corresponds to a target color desired to be printed.

U.S. Pat. No. 5,136,372 discloses a color xerographic printer. A spatial frequency detector detects a spatial frequency relating to an image of a prescribed color for every portion of an image to be formed. The images are formed with different xerographic techniques, depending on whether there is high spatial frequency of the image desired to be printed.

U.S. Pat. No. 5,140,411 discloses a color image reader, in which light from the original image is divided, by means of a prism, into separate components which can be fed to a discriminator for discriminating between a chromatic portion of the light image and an achromatic portion of the light image.

U.S. Pat. No. 5,208,663 discloses an image processing apparatus in which color image data is classified as including either an achromatic color, a chromatic color, or an intermediate color. The apparatus further includes a discrimination circuit for discriminating a kind of the original image on the basis of the color image data, with a classifying circuit being capable of changing the classifying criterion in accordance with the discriminated kind of the original image.

U.S. Pat. No. 5,528,386 describes an apparatus for taking in original RGB image and converting the signals therefrom to a CMYK image which can be fed to a printing apparatus.

According to one aspect of the present invention, there is provided, in a digital printing apparatus capable of printing a desired color as a combination of a subset of a set of colorants, the set of colorants comprising at least first and second colorants and an intermediate colorant disposed between the first and second colorants in color space, a method of converting color primary image signals operative of the first colorant and second colorant to hi-fi image signals operative of the first colorant, second colorant, and intermediate colorant. A combination of the primary image signals is substituted with an intermediate image signal representative of the intermediate colorant according to a non-linear function in reflectance coordinates.

According to another aspect of the present invention, there is provided, in a digital printing apparatus capable of printing a desired color as a combination of a subset of a set of colorants, the set of colorants comprising at least first and second primary colorants and an intermediate colorant disposed between the first and second colorants in color space, a method of converting color primary image signals operative of the first colorant and second colorant to hi-fi signals operative of the first colorant, second colorant, and intermediate colorant. For obtaining colors in a first portion of color space between the first colorant, only the first colorant and the second colorant are combined, a proportion of the first colorant to the second colorant varying in a linear function with varying distance in color space from the first colorant. For obtaining colors in a second portion of color space between the first colorant and the second colorant, the second colorant is combined with the intermediate colorant, a substitution of the second colorant with the intermediate colorant varying in a nonlinear function with varying distance in color space from the second colorant.

In the drawings:

FIG. 2A is a graph showing a linear substitution of a hi-fi colorant for one or more primary-color colorants, according to a known color substitution system, while

Figure 4:
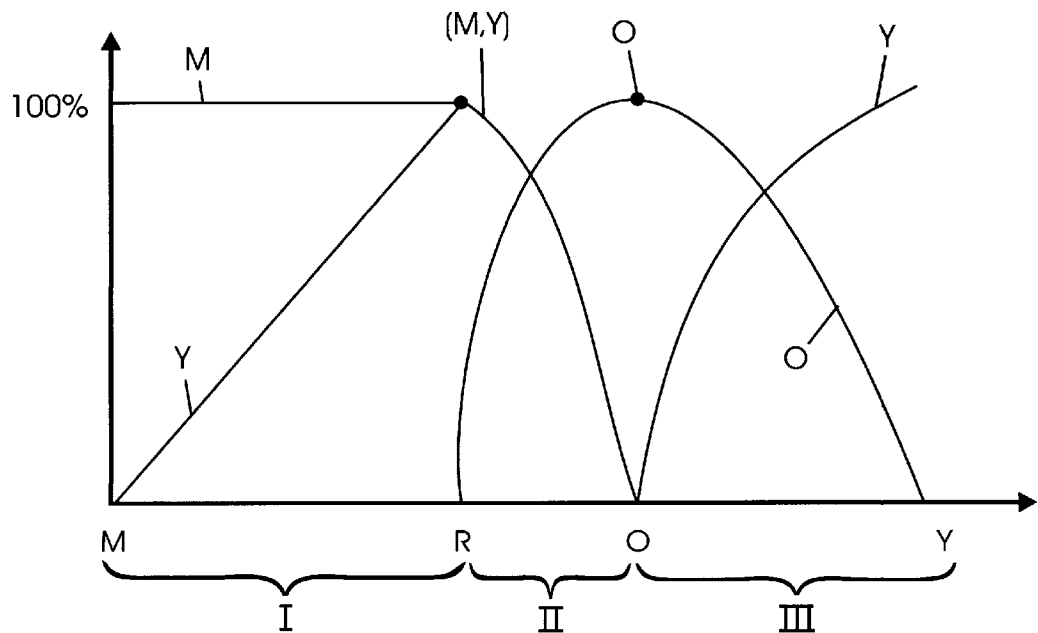
Figure 5:
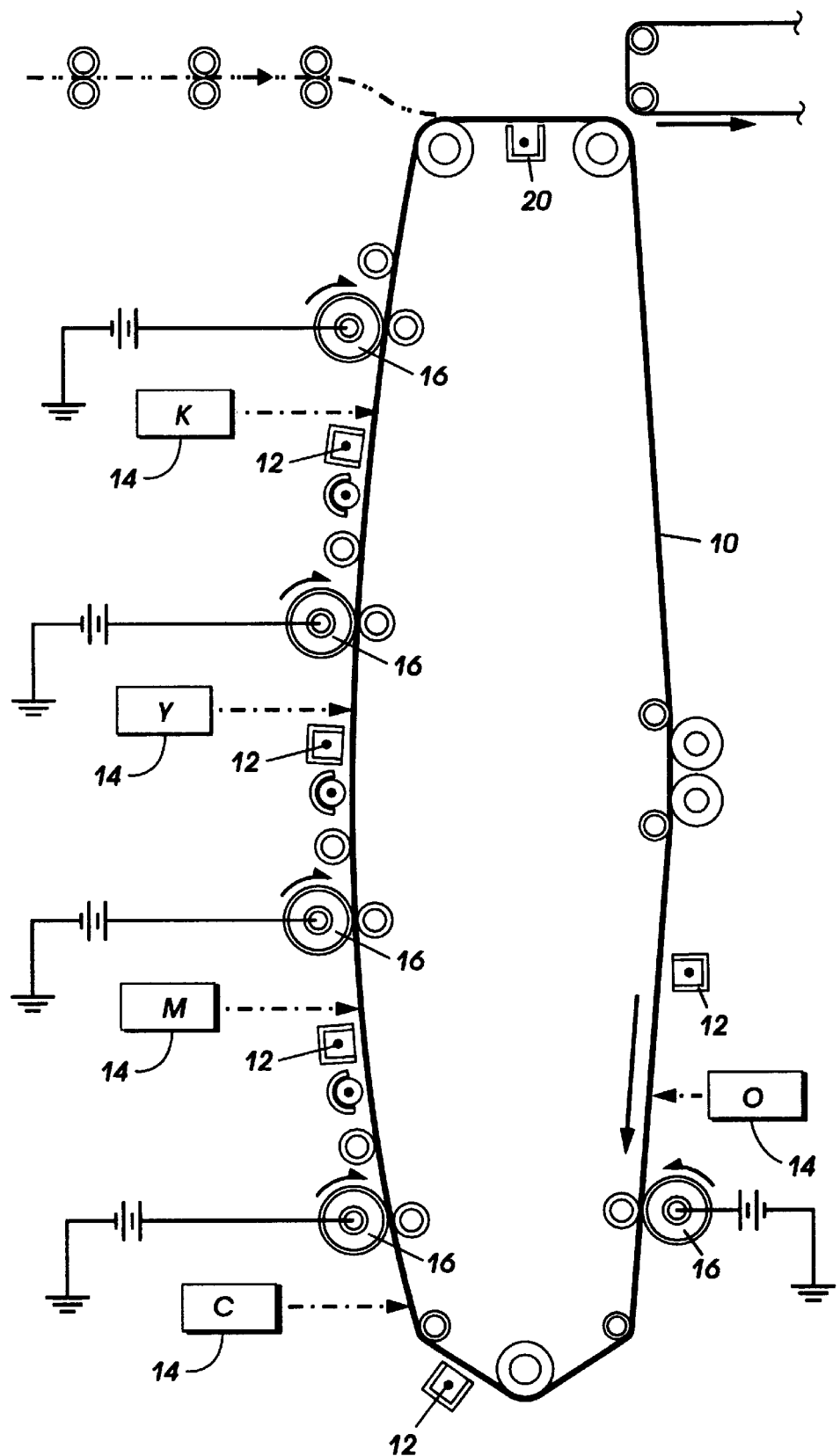

FIG. 4 shows a substitution function of a hi-fi colorant for one or more primary-color colorants according to another embodiment of the present invention, wherein the function includes both a linear and non-linear portions; and FIG. 5 is a simplified elevational view showing the basic elements of a five-color hi-fi xerographic printing system which can be used in conjunction with the present invention.

FIG. 5 is a simplified elevational view showing the essential portions of a xerographic engine suitable for image-on-image printing of full-color images. In the particular architecture shown in FIG. 5, a series of development units successively lay down different primary-colored toners on a single photoreceptor, and the accumulated different-colored toners are then transferred to a print sheet, such a sheet of paper. As shown in the Figure, a photoreceptor belt 10 is entrained around a series of rollers, and along the circumference of the photoreceptor belt 10 are disposed a series of charge corotrons, each indicated as 12, exposure devices indicated as 14, which, as known in the art, could comprise for example an independent laser scanner or LED print bar, and a developing apparatus, such as a charged donor roll 16, which applies appropriately-charged toner to the suitably charged or discharged areas created by exposure device 14. A person of skill in the art of xerographic printing will appreciate that each of combinations of charge corotron 12, exposure device 14, and development unit 16 along the circumference of photoreceptor 10 represents an "imaging station" capable of placing toner of a particular primary or other color in imagewise fashion on the photoreceptor 10. The location of where these colors are to be placed will, of course, be determined by the various areas discharged by the series of exposure devices 14. There may also be, disposed along photoreceptor belt 10, any number of ancillary devices, such as cleaning corotrons, cleaning blades, etc., as would be known to one of skill in the art. By causing a particular image area on the photoreceptor belt 10 to be processed by a number of stations, each station corresponding to one primary color, it is apparent that a full-color image, comprising imagewise-placed toners of the different primary colors, will eventually be built-up on photoreceptor 10. This built-up full-color image is then transferred to a print sheet, such as at transfer corotron 20, and then the print sheet is fused to fix the full-color image thereon.

In a "hi-fi" full-color printing system, an example of which is shown in the Figure, there are provided, in addition to the various primary-color imaging stations indicated as C, M, Y, and K, one or more additional imaging stations; in a full hi-fi color system, there would be seven such imaging stations, consisting of not only the CMYK imaging stations, but three additional imaging stations for the RGB colors as well. In a proposed design for a hi-fi color printer, because of empirical studies of the nature of color documents that are typically desired to be printed, it has been found that a useful design choice is to provide, as one of the additional colors, not a pure red, but a toner of closer to an orange color, such as indicated by the spot marked O in FIG. 1, which as can be seen is placed between red and yellow in color space.

Figure 1:
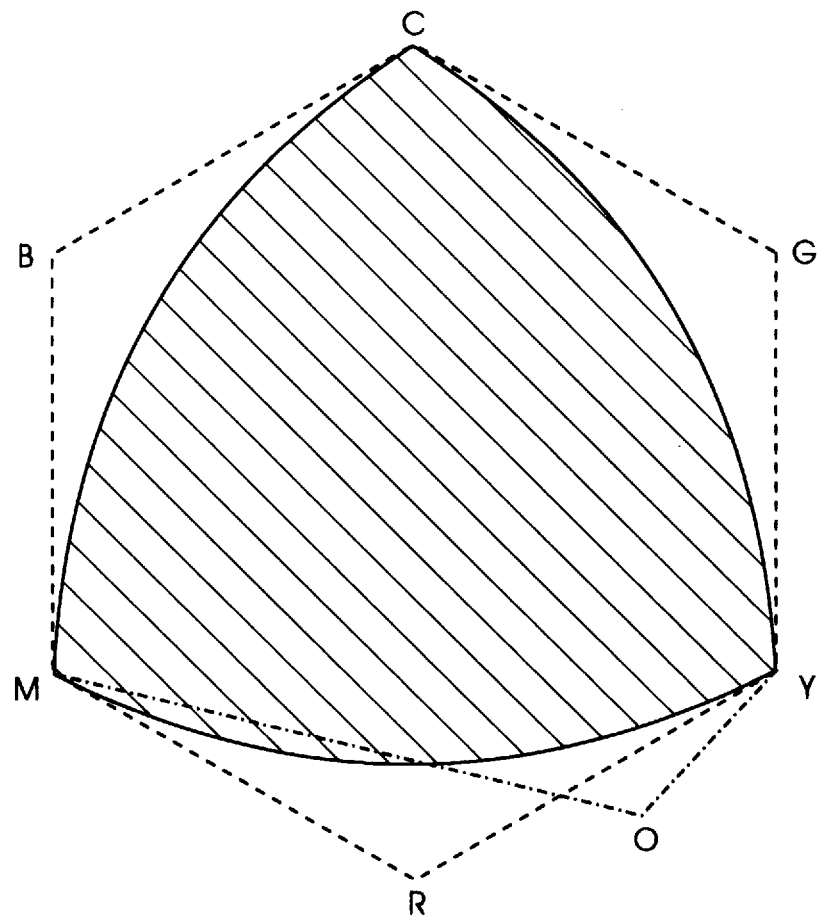
FIG. 1 shows a representative section of color space illustrating a principle of "hi-fi" color according to the present invention.
Figure 2A:
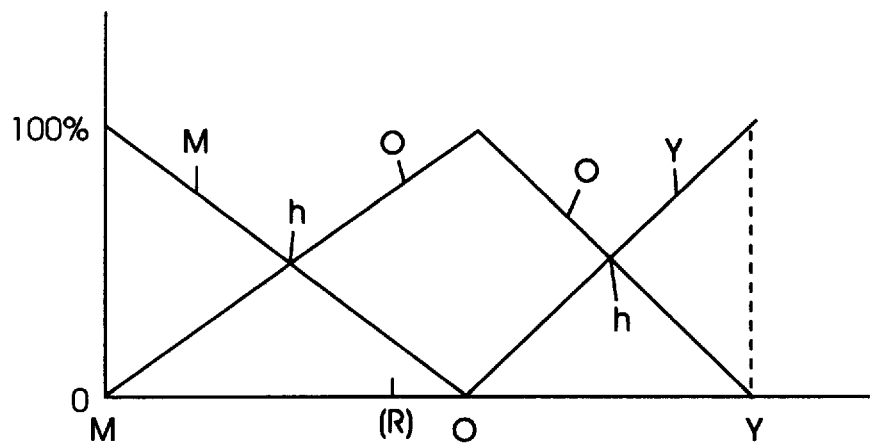

As shown in FIG. 1, the dot-dash line connecting the locations of magenta (M), orange (O), and yellow (Y) represent a maximum chrominance path for those colors obtainable by combining colorants (such as toner or liquid ink) of these three colors. FIG. 2A is a graph showing a straightforward method of obtaining the colors along the dot-dash line in FIG. 1 by, in one stage, substituting orange colorant at the expense of magenta colorant until there is laid down nothing but orange colorant, and, in the second stage, moving from the O to the Y portion of the dot-dash line in FIG. 1, by substituting yellow toner for the orange toner until nothing but yellow toner is laid down. As illustrated in FIG. 2A, such a purely linear substitution between 100% coverage and 0% coverage in reflectance space for different types of colorant will theoretically allow one to obtain any of the full-chrominance colors along the dot-dash line in FIG. 1. However, experience has shown that this type of substitution does not in fact yield optimal results.

Figure 2B:
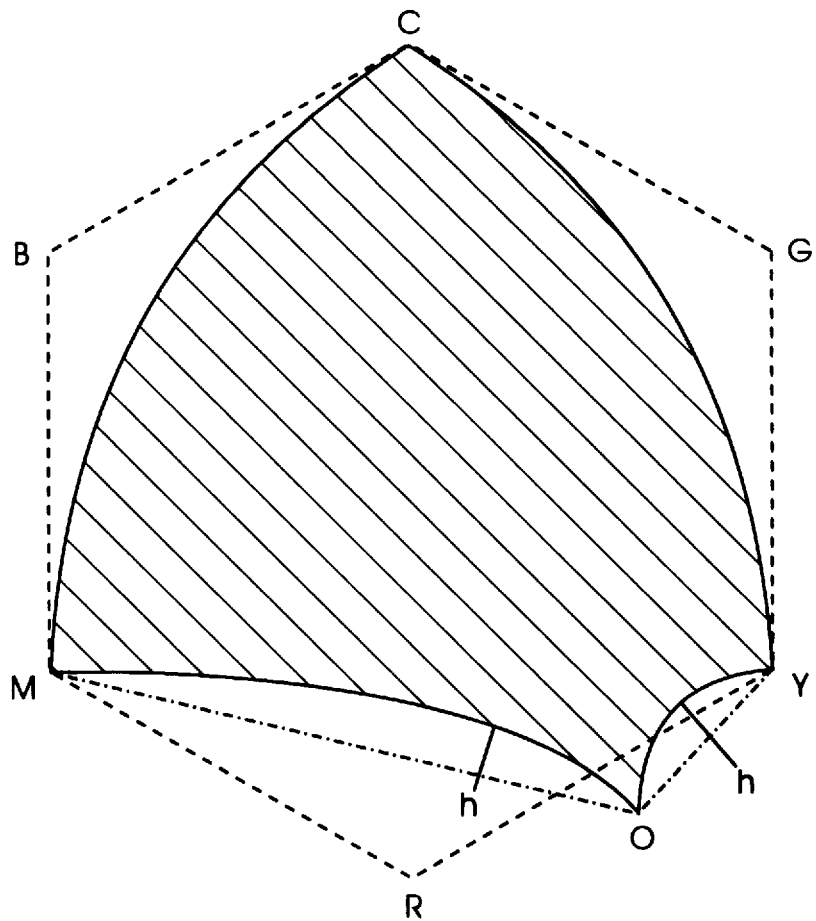
FIG. 2B shows the observed affect of such a linear substitution system in the obtaining of a gamut of possible colors and color space.

FIG. 2B illustrates the section of color space shown in FIG. 1, with the solid line indicating the approximate behavior of color laid down in a real-world printing system. If a random or angled-screen system of halftoning primary colors is used, at the half-and-half areas, there will be a great deal of "white space" where there is no colorant in the image. Particularly at points where there is an almost equal proportion of magenta or yellow and orange colorant, such as indicated as h in FIG. 2A, the presence of the underlying white paper becomes very apparent in a lack of full chrominance, particularly in the portions of the curve marked h in FIG. 2B. As shown in FIG. 2B, this lack of chrominance as paper shows through causes the actual obtained color caused by the mixture, shown by the solid line in FIG. 2B, to become concave: the more mixture of types of colorants, the farther the chrominance is from the theoretically optimal.

It will be appreciated that the general technique of substituting a colorant of an intermediate color for what would otherwise be a combination of two primary colors, such as substituting red or orange colorant for a combination of magenta and yellow, is conceptually a variation of the well-known "undercolor removal" technique used in four-color printing, wherein particularly dark areas composed of three primary colors receive a substitution of black colorant in lieu of attempting to obtain the relatively dark color with three colorants. In brief, undercolor removal works by taking the minimum of the three primary colors which would be used to theoretically obtain the desired dark combination color, and substitute a proportion of black colorant as a function of the minimum of the three primary colors.

The linear substitution of orange colorant for magenta or yellow as shown in FIGS. 2A and 2B is in fact an embodiment of a technique described in U.S. Pat. No. 4,812,899 to Kueppers, mentioned above. According to the Kueppers system, supplying of additional colors to the subtractive primary colors is a form of "undercolor removal" in reflectance space. Because many halftones, such as 50% coverage of a particular colorant, is obtained by a screen of regularly oriented or randomly oriented halftone dots, the combination of two types of dots at 50% coverage each can easily leave 25% of the print sheet in the relevant area uncovered by any colorant.

Figure 3:
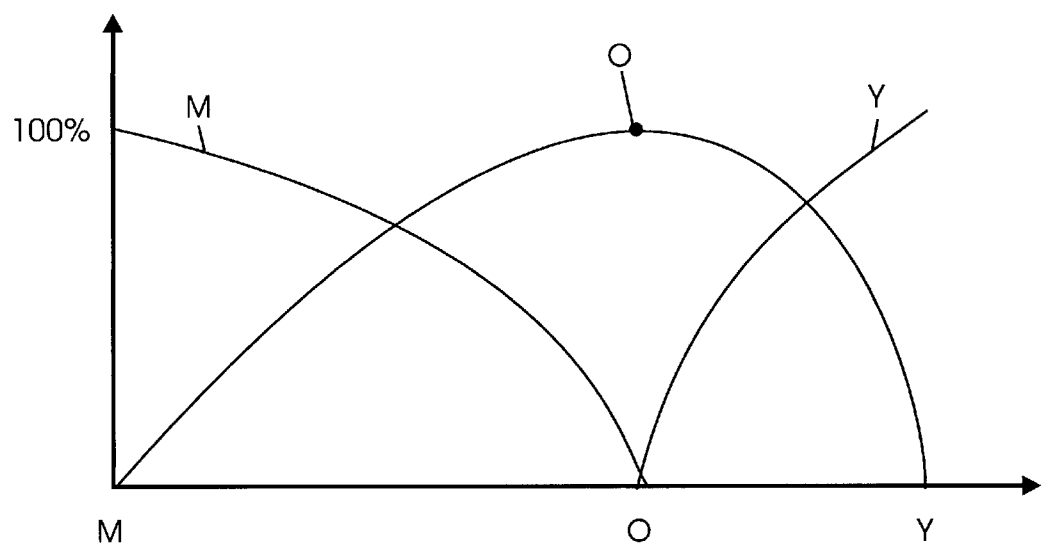
FIG. 3 is a graph illustrating a non-linear, or density-based, substitution of hi-fi colorants for primary color colorants, according to the present invention.

FIG. 3 illustrates a substitution scheme, much as shown in FIG. 2A, according to the present invention. As can be seen, the key difference between the substitution algorithm governing FIG. 2A and that governing FIG. 3 is the fact that the substitution in FIG. 3 is non-linear, in terms of the amount of colorant substituted for another as one moves along a path from M to Y. For purposes of the claims herein, "non-linear" shall be defined as a function in which a percentage decrease in one color as one moves in a path through color space is not necessarily matched by an equal percentage increase in the substitute color.

The x- and y-axes in FIG. 3 represent the relative reflectances of colorants on the print sheet. The non-linear functions in FIG. 3 relate to the non-linear relationship between reflectance and density. The method of Kueppers may be thought of as a type of undercolor removal in a reflectance color space, whereas the system of the present invention performs a type of undercolor removal in a density space. The conversion from reflectance to density prior to performing undercolor removal is a crucial step in achieving a near-optimum gamut for colors lying between the subtractive primary colors.

The steps to convert CMY to CMYKOGB may be summarized as follows.

1) Convert C, M, Y from reflectance to density coordinates using the formula $D(R) = -\log_{10}(1-R)$, for $0 \leq R < 1$;

$D(1) = D_{max}$, where D denotes density and 1-R denotes reflectance (or, equivalently, R denotes absorptance). Henceforth, all quantities are assumed to represent density. This step, with its logarithmic function, creates the desired non-linearity in the substitution function.

2) Let $C_1$, $C_2$, and $C_3$ represent the 3 colorants CMY in increasing order of density (i.e. $C_1 = \min(C,M,Y)$, etc). A transformation is first made from CMY to CMYK (i.e. conventional undercolor removal):

$K \leftarrow f_1(C_1)$;

$C_1 \leftarrow C_1 - f_2(C_1)$;

$C_2 \leftarrow C_2 - f_2(C_1)$;

$C_3 \leftarrow C_3 - f_2(C_1)$;

where $f_1()$ and $f_2()$ are smooth monotonically increasing functions with certain properties that dictate the relative proportions of C,M,Y in relation to K.

3) Apply undercolor removal to the colorants $C_2$ and $C_3$ to introduce a hi-fi primary (H):

$H \leftarrow f_3(C_2)$;

$C_2 \leftarrow C_2 - f_4(C_2)$;

$C_3 \leftarrow C_3 - f_4(C_2)$;

where $f_3()$ and $f_4()$ are again smooth monotonic functions that dictate the relative proportions of the CMY primaries and the hi-fi color H. The latter is chosen to be the one that is closest in hue to that of the secondary overprint $C_2C_3$. For example, if $C_2$ is the yellow colorant, and $C_3$ is the cyan colorant, the H is the green colorant, as this will be closes in hue to the CY overprint.

4) Convert density to reflectance via the formula $R(D) = 1 - 10^{-D}$; for $0 \leq D < D_{max}$ $R(D_{max}) = 1$ Where, once again, 1-R denotes reflectance or R denotes absorptance. In the simple case where $f_1(x) = f_2(x) = f_3(x) = f_4(x) = x$ (which is termed 100% UCR), signals for three colorants are obtained: one primary colorant (out of C, M, Y); one hi-fi colorant (out of O, G, B), and K. In this case, the neutral axis is reproduced with pure K. In general, however, this scheme will allow up to five colorant mixtures (CMYK, and one hi-fi primary). The re-converted reflectance-based signals can then be used to operate a digital printing apparatus.

Within the scope of the claims hereinbelow, the above-described calculations can be performed on image signals in real time, or alternately, the above calculations can be performed beforehand on a set of possible image signals, to create one or more look-up tables which are used in real time to convert color image signals.

Returning to FIG. 1, in a printing system having an orange "hi-fi" colorant available as shown, it will be apparent that the dot-dash line indicating the optimal color gamut among M, O, and Y essentially "leaves out" the corner of the hexagon corresponding to process red, consisting of MY. As mentioned above, in for example, a seven-color hi-fi xerographic system, empirical studies of typically-produced documents have indicated a greater need for an orange color as opposed to a pure red. However, in order to obtain an optimal red, it would be most desirable to create the red using only magenta and yellow colorant, and leave the orange colorant, which is at cross-purposes with the creation of red, "out of the equation." In order to do this, the present invention proposes a combination linear and non-linear substitution technique that will enable a combination of magenta and yellow colorant to obtain the best practical red, while simultaneously enabling the use of orange colorant only in those situations where such an orange colorant provides an advantage.

FIG. 4 is a diagram showing substitution of different types of colorants according to the present invention, to achieve the maximum practical chroma of both red and orange given the three types of available colorants. As can be seen in the x-axis of FIG. 4, the selection of color available by various combinations of these colorants ranges from pure magenta through the best possible red, to the pure orange obtained by pure orange colorant, and finally to the pure yellow obtained by pure yellow colorant.

Moving along the x-axis of FIG. 4, it can be seen that the substitution function has three distinct portions as one moves in a path through color space from magenta to red to orange to yellow, one showing a linear function, and the other two showing non-linear functions. One portion of the function, indicated as 1, extending from pure magenta (M) to pure red (R), starts with, of course, a full placement of magenta with no second colorant. However, to get from pure magenta (M) to red (R), a full coverage of magenta remains constant while a linearly-increasing proportion of yellow is laid thereover. Such a color-on-color technique is particularly useful in color xerographic systems, wherein multiple layers of toner may be laid either on a photoreceptor, or on some sort of transfer roll, as is known in the art. Only when there is full coverage of both yellow and magenta will the maximum practical red (R) be obtained. It should be noted that for the entire first portion between M and R, the functions are linear and orange colorant plays absolutely no part.

In another portion of the substitution function, indicated as II, from red (R) to orange (O), there is a direct but non-linear substitution of the red created by a combination of magenta and yellow, with an increasing amount of orange colorant. As shown in FIG. 4, both magenta (M) and yellow (Y) colorants are decreased together and substituted with orange colorant until a pure orange, created by uncombined orange colorant, is obtained. In this particular embodiment, in portion II, the values of M and Y are set equal to each other and decrease together; however, in another possible embodiment, the values of M and Y need not be dependent on each other. It is conceivable, for example, to have M and Y decrease at different rates as O is approached, or even to maintain M or Y at 100% coverage throughout all or part of portion II.

In a portion of the substitution function between pure orange and pure yellow, indicated as III, there is once again a non-linear substitution from all orange to all yellow, as shown.

While the invention has been described with reference to the structure disclosed, it is not confined to the details set forth, but is intended to cover such modifications or changes as may come within the scope of the following claims.

I claim:

1. In a digital printing apparatus capable of printing a desired color as a combination of a subset of a set of colorants, the set of colorants comprising at least first and second colorants and an intermediate colorant disposed between the first and second colorants in color space, the intermediate colorant being chromatic and disposed at an edge of a color gamut which the apparatus is capable of printing, a method of converting color primary image signals operative of the first colorant and second colorant to hi-fi image signals operative of the first colorant, second colorant, and intermediate colorant, comprising the step of:

performing a substitution of a combination of the primary image signals with an intermediate image signal representative of the intermediate colorant according to a non-linear function in reflectance coordinates.

2. The method of claim 1, wherein the substitution step includes entering the primary image signals into an algorithm including a logarithmic function.

3. The method of claim 1, wherein the substitution step includes converting the primary image signals from reflectance coordinates to density coordinates.

4. The method of claim 3, wherein the substitution step includes performing an undercolor removal calculation on an image signal in density coordinates.

5. The method of claim 3, further comprising the steps of converting the substituted image signals from density coordinates to reflectance coordinates; and operating a digital printing apparatus according to the substituted image signals in reflectance coordinates.

6. In a digital printing apparatus capable of printing a desired color as a combination of a subject of a set of colorants, the set of colorants comprising at least first and second primary colorants and an intermediate colorant disposed between the first and second colorants in color space, the intermediate colorant being chromatic and disposed at an edge of a color gamut which the apparatus is capable of printing, a method of converting color primary image signals operative of the first colorant and second colorant to hi-fi signals operative of the first colorant, second colorant, and intermediate colorant, comprising the steps of:

for obtaining colors in a first portion of color space between the first colorant and the second colorant, combining only the first colorant and the second colorant, a proportion of the first colorant to the second colorant varying in a linear function with varying distance in color space from the first colorant; and for obtaining colors in a second portion of color space between the first colorant and the second colorant, combining the second colorant with the intermediate colorant, a substitution of the second colorant and the intermediate colorant varying in a non-linear function with varying distance in color space from the second colorant.

7. The method of claim 6, further comprising the step of for obtaining colors in a third portion of color space between the first colorant and the second colorant, combining the first colorant and the second colorant with the intermediate colorant, a substitution of at least one of the first colorant and second colorant varying in a non-linear function with varying distance in color space from the first colorant.

* * * * *